US009727084B2

(12) United States Patent
Vroom et al.

(10) Patent No.: US 9,727,084 B2
(45) Date of Patent: Aug. 8, 2017

(54) DRIVETRAIN FOR A MOTORIZED DOCKING STATION

(71) Applicant: Henge Docks LLC, Arlington, VA (US)

(72) Inventors: Matthew Leigh Vroom, San Francisco, CA (US); Brandon Parod, Alameda, CA (US)

(73) Assignee: Henge Docks LLC, Arlington, VA (US)

( * ) Notice: Subject to any disclaimer, the term of this patent is extended or adjusted under 35 U.S.C. 154(b) by 0 days.

(21) Appl. No.: 14/987,874

(22) Filed: Jan. 5, 2016

(65) Prior Publication Data

US 2017/0115694 A1     Apr. 27, 2017

Related U.S. Application Data

(63) Continuation-in-part of application No. 14/921,041, filed on Oct. 23, 2015, now Pat. No. 9,575,510.

(51) Int. Cl.
*G06F 1/16*     (2006.01)
*H02K 7/116*     (2006.01)

(52) U.S. Cl.
CPC ........... *G06F 1/1632* (2013.01); *H02K 7/116* (2013.01)

(58) Field of Classification Search
CPC .............................. G06F 1/1632; F16B 2/065
See application file for complete search history.

(56) References Cited

U.S. PATENT DOCUMENTS

| | | |
|---|---|---|
| 2,531,291 A | 11/1950 | Olson |
| 2,903,668 A | 9/1959 | Cornell, Jr. |
| 3,727,171 A | 4/1973 | Coles et al. |
| 3,775,733 A | 11/1973 | Ege |
| 3,781,766 A | 12/1973 | Teagno et al. |
| 3,816,821 A | 6/1974 | Rhodes |
| 3,873,172 A | 3/1975 | Paullus |
| 4,097,113 A | 6/1978 | McKelvy |
| 4,178,060 A | 12/1979 | Coffey |
| 4,387,951 A | 6/1983 | Hall et al. |
| 4,418,975 A | 12/1983 | O'Keefe, II |
| 4,490,002 A | 12/1984 | Fowler |
| 4,659,166 A | 4/1987 | Morningstar et al. |
| 4,726,789 A | 2/1988 | Yaffe |
| 4,762,388 A | 8/1988 | Tanaka et al. |
| 4,836,804 A | 6/1989 | London et al. |
| 4,842,363 A | 6/1989 | Margolin et al. |
| 4,870,702 A | 9/1989 | Azzouni |

(Continued)

OTHER PUBLICATIONS

U.S. Appl. No. 14/921,041, Matthew L. Vroom.
U.S. Appl. No. 14/987,874, Matthew L. Vroom.
U.S. Appl. No. 15/194,729, Matthew L. Vroom.

*Primary Examiner* — Anthony Q Edwards
(74) *Attorney, Agent, or Firm* — Maskell Law PLLC; Benjamin E. Maskell

(57) ABSTRACT

Disclosed is a drivetrain for use in a motorized docking station including a driveshaft, a first threaded end of the driveshaft having a left-hand thread, a second threaded end of the driveshaft having a right-hand thread, a plurality of gears, an electric motor coupled to the plurality of gears, and a linking gear of the plurality of gears, the linking gear fixed to the drive shaft. The drivetrain can have a manual override gear coupled to the driveshaft and a tool-receiving portion of the manual override gear.

18 Claims, 13 Drawing Sheets

(56) References Cited

U.S. PATENT DOCUMENTS

| | | |
|---|---|---|
| 4,881,910 A | 11/1989 | Odemer |
| 4,899,591 A | 2/1990 | Kibblewhite |
| 5,030,128 A | 7/1991 | Herron et al. |
| 5,092,788 A | 3/1992 | Pristupa, Jr. et al. |
| 5,137,455 A | 8/1992 | Moerbe et al. |
| 5,186,646 A | 2/1993 | Pederson |
| 5,225,825 A | 7/1993 | Warren |
| 5,283,714 A | 2/1994 | Tsai |
| 5,411,416 A | 5/1995 | Balon et al. |
| 5,460,547 A | 10/1995 | Belt et al. |
| 5,477,415 A * | 12/1995 | Mitcham ............ G06F 1/1632 361/679.42 |
| 5,569,052 A | 10/1996 | Belt et al. |
| 5,612,927 A * | 3/1997 | Morrison ............ G06F 1/184 360/99.07 |
| 5,679,026 A | 10/1997 | Fain et al. |
| 5,683,261 A | 11/1997 | Ahles et al. |
| 5,692,400 A * | 12/1997 | Bliven ............ E05B 73/0005 361/679.43 |
| 5,725,397 A | 3/1998 | Fukamachi et al. |
| 5,729,478 A | 3/1998 | Ma et al. |
| 5,738,537 A | 4/1998 | Setoguchi et al. |
| 5,805,412 A | 9/1998 | Yanagisawa et al. |
| 5,825,617 A | 10/1998 | Kochis |
| 5,997,323 A | 12/1999 | Youn |
| 6,045,410 A | 4/2000 | Norizuki et al. |
| 6,046,571 A | 4/2000 | Bovio et al. |
| 6,061,233 A | 5/2000 | Jung |
| 6,061,234 A | 5/2000 | Broder |
| 6,119,237 A | 9/2000 | Cho |
| 6,151,218 A | 11/2000 | Pirdy et al. |
| 6,175,926 B1 | 1/2001 | Fogle |
| 6,206,578 B1 | 3/2001 | Shin et al. |
| 6,236,571 B1 | 5/2001 | Dohi |
| 6,275,378 B1 * | 8/2001 | Lee ............ E05B 73/0082 248/553 |
| 6,280,212 B1 | 8/2001 | Nguyen |
| 6,309,230 B2 | 10/2001 | Helot |
| 6,312,295 B2 | 11/2001 | Nishimatsu |
| 6,321,340 B1 | 11/2001 | Shin et al. |
| 6,343,957 B1 | 2/2002 | Kuo et al. |
| 6,352,447 B1 | 3/2002 | Ruth |
| 6,411,503 B1 | 6/2002 | Kambayashi et al. |
| 6,424,524 B2 | 7/2002 | Bovio et al. |
| 6,524,140 B2 | 2/2003 | Takagi et al. |
| 6,533,599 B1 | 3/2003 | Singleton, Jr. |
| 6,558,201 B1 | 5/2003 | Begley et al. |
| 6,583,985 B2 | 6/2003 | Nguyen |
| 6,594,146 B2 | 7/2003 | Frangesch |
| 6,663,439 B2 | 12/2003 | Henry et al. |
| 6,666,715 B2 | 12/2003 | Fujita et al. |
| 6,667,881 B2 | 12/2003 | Oross |
| 6,697,892 B1 | 2/2004 | Laity et al. |
| 6,724,615 B2 | 4/2004 | Kambayashi et al. |
| 6,767,253 B1 | 7/2004 | Werner et al. |
| 6,796,844 B1 | 9/2004 | Edwards, III |
| 6,814,626 B2 | 11/2004 | Wen-Yao |
| 6,833,988 B2 | 12/2004 | Kamphuis |
| 6,878,016 B2 | 4/2005 | Wulff et al. |
| 6,912,125 B2 | 6/2005 | Weng |
| 6,934,788 B2 | 8/2005 | Laity et al. |
| 6,943,527 B2 | 9/2005 | Liu et al. |
| 7,017,243 B2 | 3/2006 | Carnevali |
| 7,077,709 B1 | 7/2006 | Shin-Ting |
| 7,081,025 B2 | 7/2006 | Zhang et al. |
| 7,094,112 B2 | 8/2006 | Arai et al. |
| 7,110,252 B2 | 9/2006 | Liang |
| 7,144,278 B2 | 12/2006 | Le Gallic et al. |
| 7,184,266 B1 | 2/2007 | Chen |
| 7,247,032 B2 | 7/2007 | Merz |
| 7,320,614 B2 | 1/2008 | Toda et al. |
| 7,417,855 B2 | 8/2008 | Carnevali |
| 7,503,808 B1 | 3/2009 | O'Shea |
| 7,508,661 B2 | 3/2009 | Carnevali |
| 7,551,458 B2 * | 6/2009 | Carnevali ............ B60R 11/0252 174/520 |
| 7,554,819 B2 | 6/2009 | Chen et al. |
| 7,563,140 B1 | 7/2009 | Wan et al. |
| 7,583,495 B2 * | 9/2009 | Carnevali ............ G06F 1/1632 361/679.29 |
| 7,601,024 B2 | 10/2009 | Martich |
| 7,690,944 B2 | 4/2010 | Matsumura et al. |
| 7,857,664 B2 | 12/2010 | Waryck et al. |
| 7,914,348 B1 | 3/2011 | Lin |
| 7,924,559 B2 | 4/2011 | Kuo |
| 7,942,705 B2 | 5/2011 | Murphy et al. |
| 7,978,466 B2 | 7/2011 | Lewandowski |
| 8,074,951 B2 * | 12/2011 | Carnevali ............ B60R 11/02 108/143 |
| 8,079,880 B2 | 12/2011 | Lin et al. |
| 8,105,108 B2 | 1/2012 | Vroom et al. |
| 8,212,145 B2 | 7/2012 | Nagai et al. |
| 8,272,903 B2 | 9/2012 | Lin |
| 8,353,730 B1 | 1/2013 | Wang et al. |
| 8,373,984 B2 | 2/2013 | Lin |
| 8,419,479 B2 | 4/2013 | Vroom et al. |
| 8,512,079 B2 | 8/2013 | Vroom et al. |
| 8,512,080 B2 | 8/2013 | Vroom et al. |
| 8,568,160 B2 | 10/2013 | Coggins et al. |
| 8,585,443 B1 | 11/2013 | Vroom et al. |
| 8,699,211 B2 | 4/2014 | Kao |
| 8,867,202 B2 | 10/2014 | Williams |
| 9,014,393 B2 * | 4/2015 | Huh ............ B60R 11/02 381/386 |
| 9,309,698 B2 | 4/2016 | Vroom |
| 9,347,245 B2 * | 5/2016 | Vroom ............ G06F 1/1632 |
| 2001/0012718 A1 | 8/2001 | Nishimatsu |
| 2001/0012734 A1 | 8/2001 | Nishimatsu |
| 2002/0037669 A1 | 3/2002 | D'Addario |
| 2002/0123271 A1 | 9/2002 | Henry et al. |
| 2003/0095395 A1 | 5/2003 | Clark et al. |
| 2003/0220001 A1 | 11/2003 | Milan |
| 2003/0231465 A1 | 12/2003 | Weng |
| 2004/0053538 A1 | 3/2004 | Villain |
| 2004/0077225 A1 | 4/2004 | Chun-Fu |
| 2004/0115994 A1 | 6/2004 | Wulff et al. |
| 2004/0120112 A1 | 6/2004 | Mullen et al. |
| 2005/0026510 A1 | 2/2005 | Orihara |
| 2005/0064765 A1 | 3/2005 | Simpson et al. |
| 2005/0070170 A1 | 3/2005 | Zhang et al. |
| 2005/0112940 A1 | 5/2005 | Naganishi |
| 2005/0128687 A1 | 6/2005 | Liang |
| 2005/0168937 A1 | 8/2005 | Yin et al. |
| 2005/0266720 A1 | 12/2005 | Lin |
| 2005/0286219 A1 | 12/2005 | Kim |
| 2006/0061964 A1 | 3/2006 | Cheng |
| 2006/0079136 A1 | 4/2006 | Wei |
| 2006/0085584 A1 | 4/2006 | Chen et al. |
| 2006/0139875 A1 | 6/2006 | Cheng et al. |
| 2006/0148328 A1 | 7/2006 | Le Gallic |
| 2006/0171112 A1 | 8/2006 | Lev et al. |
| 2006/0250767 A1 | 11/2006 | Brophy et al. |
| 2007/0014080 A1 | 1/2007 | McCormack |
| 2007/0022582 A1 | 2/2007 | Carnevali |
| 2007/0070598 A1 | 3/2007 | Chuang |
| 2007/0177347 A1 | 8/2007 | Nishiyama |
| 2007/0224889 A1 | 9/2007 | Ito |
| 2007/0232152 A1 | 10/2007 | Hong |
| 2007/0258206 A1 | 11/2007 | Huang |
| 2008/0270664 A1 * | 10/2008 | Carnevali ............ G06F 1/1632 710/303 |
| 2009/0016015 A1 | 1/2009 | Seibert et al. |
| 2009/0023347 A1 | 1/2009 | Hou et al. |
| 2009/0158423 A1 | 6/2009 | Orlassino et al. |
| 2009/0212189 A1 * | 8/2009 | Carnevali ............ B25B 5/02 248/346.04 |
| 2010/0073862 A1 | 3/2010 | Carnevali |
| 2010/0158297 A1 | 6/2010 | Stuczynski |
| 2010/0195279 A1 | 8/2010 | Michael |
| 2010/0197173 A1 | 8/2010 | Tsunoda et al. |
| 2010/0243398 A1 | 9/2010 | Nagami |
| 2010/0265652 A1 | 10/2010 | Agata et al. |
| 2010/0309622 A1 | 12/2010 | Zimmermann |

(56) References Cited

U.S. PATENT DOCUMENTS

| | | | |
|---|---|---|---|
| 2011/0065314 A1 | 3/2011 | Vroom et al. | |
| 2011/0103003 A1 | 5/2011 | Ward et al. | |
| 2011/0134601 A1 | 6/2011 | Sa | |
| 2011/0242754 A1 | 10/2011 | Morton | |
| 2011/0273838 A1 | 11/2011 | Lin | |
| 2011/0279966 A1 | 11/2011 | Sayavong | |
| 2011/0318944 A1 | 12/2011 | Lin et al. | |
| 2012/0127651 A1* | 5/2012 | Kwon | G06F 21/88 361/679.43 |
| 2012/0162902 A1 | 6/2012 | Zhou et al. | |
| 2012/0212900 A1 | 8/2012 | Hung | |
| 2012/0212910 A1 | 8/2012 | Katsuta | |
| 2013/0073769 A1* | 3/2013 | Peng | G06F 1/1632 710/303 |
| 2013/0107446 A1 | 5/2013 | Carnevali | |
| 2013/0137297 A1 | 5/2013 | Vroom | |
| 2013/0148289 A1* | 6/2013 | Kwon | G06F 1/1632 361/679.43 |
| 2013/0277520 A1 | 10/2013 | Funk | |
| 2014/0038450 A1 | 2/2014 | Vroom et al. | |
| 2014/0055933 A1* | 2/2014 | Waki | H04M 1/04 361/679.01 |
| 2014/0094058 A1 | 4/2014 | Vroom | |
| 2014/0177153 A1* | 6/2014 | Yu | G06F 1/1632 361/679.21 |
| 2014/0181347 A1* | 6/2014 | Hamel | G06F 13/4081 710/304 |
| 2014/0328020 A1 | 11/2014 | Galant | |
| 2015/0185709 A1 | 7/2015 | Vroom | |
| 2015/0185774 A1 | 7/2015 | Vroom | |
| 2015/0185776 A1 | 7/2015 | Vroom | |
| 2015/0185777 A1 | 7/2015 | Vroom | |
| 2015/0186630 A1 | 7/2015 | Vroom | |
| 2016/0062403 A1* | 3/2016 | Risher-Kelly | G06F 1/1632 710/304 |
| 2016/0154431 A1 | 6/2016 | Vroom | |

* cited by examiner

DRIVETRAIN FOR A MOTORIZED DOCKING STATION

CROSS REFERENCE TO RELATED APPLICATION

This application is continuation-in-part of U.S. patent application Ser. No. 14/921,041 filed Oct. 23, 2015 the entirety of which is hereby incorporated by reference.

BACKGROUND OF THE INVENTION

Field of the Invention

The embodiments of the invention relate docking stations for electronic devices, and more particularly, to a horizontal docking station for a laptop computer. Although embodiments of the invention are suitable for a wide scope of applications, it is particularly suitable for a drivetrain for a motorized horizontal docking station.

Discussion of the Related Art

The related art docking stations include docking stations for laptop computers. Docking stations of the related art are generally of the form disclosed in U.S. Pat. No. 6,309,230 to Helot, particularly FIG. 1 and FIG. 2. The related art docking stations generally interface with an electronic device such as a laptop computer. The electrical connection between electronic device and docking station is generally achieved through a single, multi-pin docking port. The related art docking station generally provides a multitude of additional interface ports connected to the docking port.

Docking stations of the related art also include multi-plug to multi-port docking stations such as disclosed in U.S. Pat. Pub. 2013/0148289 of Kitae Kwon ("Kwon"), particularly in FIG. 2 (multi-plug), and FIG. 6 (multi-port). See also U.S. Pat. Pub. 2012/0127651 of Kitae Kwon, et. al. Kwon discloses, generally, a plurality of plugs on a sliding arm that can be activated by a lever. When the lever is activated, the arms squeeze together and engage the plurality of plugs with the corresponding ports of an electronic device. Kwon also discloses using a Kensington-style lock to bind the sliding arm to the chassis and prevent movement sliding arm.

Docking stations of the related art also include motorized docking stations such as disclosed in U.S. patent application Ser. No. 14/306,198 of Vroom. Vroom discloses, generally, a docking station actuated by a motor connected to rack-and-pinion arms (See Vroom, FIG. 16). The arms are connected to sliders on underside of the tray (See Vroom, FIG. 19). A motor turns the pinion gear which moves a rack-gear portion of the arms to actuate connector blocks.

The related art docking stations also include opposing connector blocks. To connect a computer to the related art docking stations, a user positions the electronic device within the docking station, and activates a lever to cause the opposing connector blocks to press into the electronic device thereby making an electrical connection between the docking station and the electronic device. In the related art, the opposing connector blocks can be connected to the lever through a hinge or a cam. Both the hinge and cam are described in U.S. Pat. Pub. 2013/0148289 of Kitae Kwon, particularly in FIG. 1A, FIG. 1B (cam), and FIG. 4 (hinge). See also U.S. Pat. Pub. 2012/0127651 of Kitae Kwon, et. al.

There are some disadvantages of the related art systems. For example, the related art docking stations rely on a lever to so that a user can manually actuate the connector blocks. The lever is generally offset from the axis of the connector blocks the lever can be accessible by a user. An offset lever creates a non-linear force on the connector block and can cause misalignment of the connector block and prevent the connector block from interfacing with the docked device as designed. The lever also has the disadvantage that it must be moved to effectuate docking and undocking. The lever can be challenging to manipulate on a crowded desk or by a person having limited dexterity.

The related art docking stations that using on a motor rely on sliding arms that are connected to an underside of the tray such as in Vroom. The sliding arms and sliding connection points of Vroom are a point of precision from which all other movement is indexed. For example, the arms of Vroom are slidably connected to the underside of the tray, the arms are connected to port blocks, the port blocks have connectors, and the connectors are positioned to interface with ports of a corresponding electronic device. However, the indexing point in Vroom (the underside of the tray) is distant from the position that precision is required (i.e. the point where the connectors are inserted into the electronic device.) Vroom therefore discloses undesirable tolerance stacking as between the indexing point and the point where precision is required. This requires adherence to very strict tolerances and increases manufacturing costs.

The rack-and-pinion arms of Vroom are precision-manufacture components that must be particularly sized, scaled, and designed for use in a particular model docking station. The rack-and-pinion arms of Vroom are not interchangeable with other docking stations and cannot easily be substituted into other models of docking stations due to differing dimensions.

The related art docking stations are also generally passive—the dock does not have awareness of whether an electronic device is present or if the connectors of the connector blocks are inserted into the docked device. A passive docking station cannot, for example, detect whether the electronic device is properly positioned within the dock.

The related art docking stations also have a predetermined range of motion for the connector blocks. This range of motion is determined by the length of the lever arms and hinges or the size of the cam. Mechanical devices, however, tend to wear with extended use. As the related art begins to wear, the range of motion for the connector blocks can become sloppy or loose. Because docking requires high tolerances, a loose connector block could cause misalignment or incomplete insertion.

The related art of Helot, requires that the electronic device includes a docking connector. Thus the docking station of Helot cannot be used with electronic devices that do not include a docking connector. Helot is also limited in that Helot does not provide a mechanism to secure either the electronic device or the docking station. While Kwon teaches using multiple plugs instead of a docking connector and using a Kensington-style lock to secure the electronic device and docking station, Kwon does not allow removal of the electronic device without also manually removing the Kensington-style lock.

SUMMARY OF THE INVENTION

Accordingly, embodiments of the invention are directed to a drivetrain for a motorized docking station that substantially obviates one or more of the problems due to limitations and disadvantages of the related art.

An object of embodiments of the invention is to provide a docking station that minimizing tolerance stacking.

Another object of embodiments of the invention is to provide a docking station for an electronic device that does not have a docking port.

Yet another object of embodiments of the invention is to provide a docking station that provides additional security features to retain an electronic device.

Still another object of embodiments of the invention is to provide an interchangable drivetrain compatible with many models of motorized docking stations.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a Precision Docking Station for an Electronic Device Having Integrated Retention Mechanism includes a port block, a first electronic connector of the port block, a retention member of the port block, a tray for receiving the electronic device, a sidewall of the tray, an interior side of the sidewall, a first through-hole of the sidewall sized to slidably receive the first connector, a second through hole of the sidewall sized to slidably receive the retention member, wherein the port block is configured to slide between a substantially open position and a substantially closed position with respect to the sidewall of the tray, and wherein the first connector protrudes from the first through-hole on the interior side of the sidewall of the tray when the port block is in the substantially closed position.

In another aspect, a Precision Docking Station for an Electronic Device Having Integrated Retention Mechanism includes a chassis, a port block configured to slide between an open position and a closed position, a void in the chassis sized to slidably retain the port block, a tray for holding the electronic device, a sidewall of the tray, an interior surface of the sidewall, a first hole in the sidewall of the tray, an electronic connector of the port block positioned to slidably interface with the first hole, a second hole in the sidewall of the tray, a retention finger of the port block positioned to slidably interface with the second hole, and wherein the electronic connector passes through the first hole in the sidewall and protrudes from the interior surface of the sidewall when the port block is in the closed position.

In yet another aspect, a Precision Docking Station for an Electronic Device Having Integrated Retention Mechanism includes a first port block, a first electronic connector of the first port block, a first retention finger of the first port block, a second port block, a second retention finger of the second port block, a tray portion for receiving the electronic device, a first sidewall, a first hole in the first sidewall for slidably receiving the first electronic connector, a second hole in the first sidewall for slidably receiving the first retention finger, a second sidewall, and a third hole in the second sidewall for slidably receiving the second retention finger.

In still another aspect, a drivetrain for a motorized docking station includes a port block, a drivetrain interface of the port block, a threaded receiving portion of the drivetrain interface, a driveshaft, and a threaded end of the driveshaft coupled to the threaded receiving portion.

In another aspect, a drivetrain for a motorized docking station includes a driveshaft, a first threaded end of the driveshaft having a left-hand thread, a second threaded end of the driveshaft having a right-hand thread, a plurality of gears, an electric motor coupled to the plurality of gears, and a linking gear of the plurality of gears, the linking gear fixed to the drive shaft. The drivetrain can have a manual override gear coupled to the driveshaft and a tool-receiving portion of the manual override gear.

In yet another aspect, a drivetrain for a motorized docking station includes a port block, a drivetrain interface of the port block, a threaded receiving portion of the drivetrain interface, a driveshaft, a first threaded end of the driveshaft having a left-hand thread and coupled to the threaded receiving portion, a plurality of gears, a electric motor coupled to the plurality of gears, a linking gear of the plurality of gears, the linking gear fixed to the drive shaft. The port block can be configured to translate between a substantially open position and a substantially closed position along the threaded end of the driveshaft.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Figure 1:
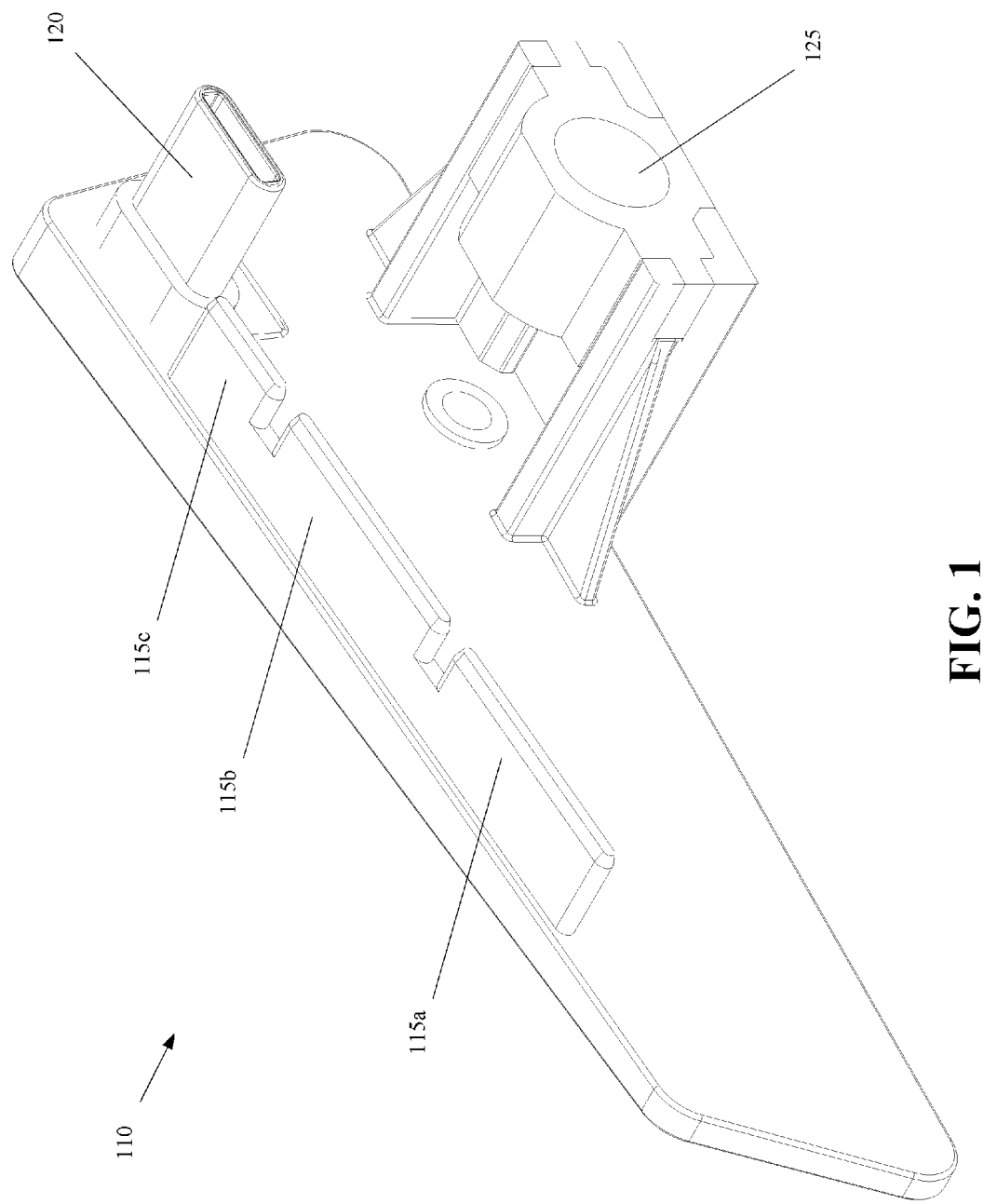
FIG. 1 is an isometric view of a port block according to an exemplary embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is an isometric view of a port block according to an exemplary embodiment of the invention. As shown in FIG. 1, a port block 110 includes retention members 115a-115c, an electronic connector 120, and a drivetrain interface 125. The port block 110 can be a left-hand-side port block for use on a left-hand-side of a docking station.

The port block 110 can include retention members 115a-115c. The retention members can be formed from rubber a rubber-like material. The retention members 115a-115c can be formed from plastic. The retention members 115a-115c can be formed from hard plastic coated in a rubber-like substance. The port block 110 can slide between an open position and a closed position. In the closed position, the retention members 115a-115c can contact a top surface of an electronic device to stabilize the electronic device within a docking station and to prevent removal of the device. In the open position, the retention members 115a-115c can be free from or clear of the electronic device in the docking station and allow removal of the electronic device. In preferred embodiments, the port block 110 can include three retention members 115a-115c as shown in FIG. 1. In other embodiments, more of fewer retention members can be used. Retention members can also be called retention fingers.

The port block 110 can include an electronic connector 120. The electronic connector 120 can be positioned to on the port block 110 to correspond to the position of a corresponding port of the electronic device (not shown). In the open position, the electronic connector 120 can be disconnected from the electronic device. In the closed position, the electronic connector 120 can be inserted into the corresponding port of the electronic device. The electronic connector 120 can be any type of electronic connector that are known in the art. In preferred embodiments of the invention, the electronic connector 120 is a USB Type-C connector and the electronic device can be a 12" Apple MacBook.

In preferred embodiments of the invention there is exactly one electronic connector on a port block. However, the invention is not limited to port blocks having only one electronic connector and includes, without limitation, port blocks having two or more electronic connectors each respectively corresponding to a port of the electronic device. The invention further contemplates port blocks having no electronic connectors and having only retention members or dummy connectors. Dummy connectors can be formed from plastic, metal, or nylon and be positioned to interface with a corresponding port of the electronic device. Dummy connectors can retain the electronic device within a docking station without making an electrical connection.

In an exemplary embodiment of the invention (not shown) a right-hand-side port block can include one or more retention members, one or more dummy connectors, or combinations of retention members and dummy connectors.

A port block 110 can include a drivetrain interface 125. The drivetrain interface 125 can connect to a drivetrain (not shown) to provide a motor force to translate the port block 110 between and open and closed position. The drivetrain can include, for example, a rack and pinion actuator. In preferred embodiments of the invention, the drivetrain (not shown) can include a rotating drive shaft having a threaded end. The threaded end can be inserted into the drivetrain interface 125 which can have a corresponding threaded hole. The drive shaft can be connected to an electric motor through a series of gears. The motor can rotate the gears which, in turn, can rotate the drive shaft which, in turn, can rotate the threaded end of the drive shaft which, in turn can interface with a threaded hole of the drivetrain interface 125 to translate the port block 110 between an open and closed position.

Figure 2:
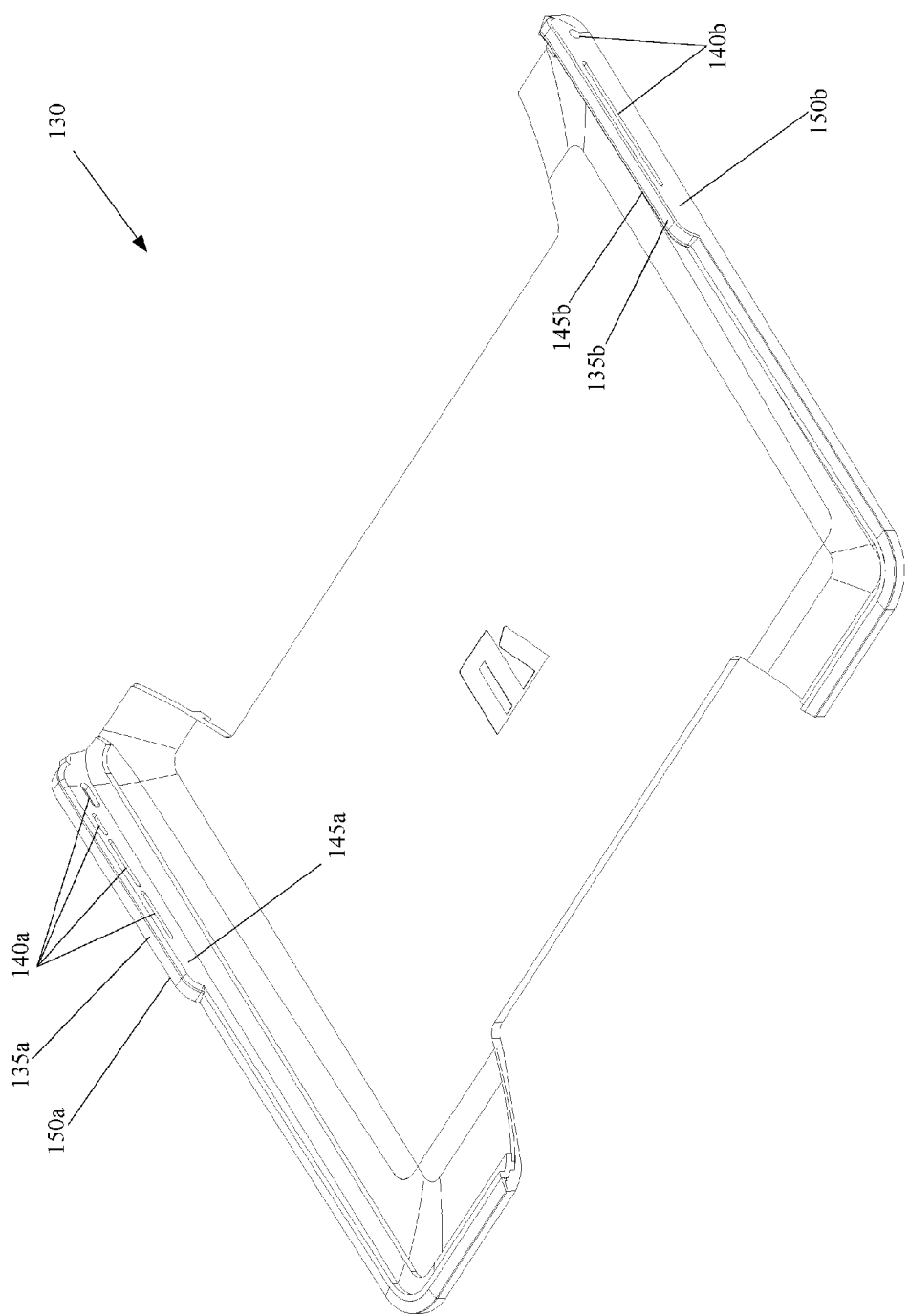
FIG. 2 is an isometric view of a tray according to an exemplary embodiment of the invention.

FIG. 2 is an isometric view of a tray according to an exemplary embodiment of the invention. As shown in FIG. 2 a tray 130 can include a left side wall 135a and a right side wall 135b. The tray 130 can be sized to precisely receive a specific electronic device such as a 12" Apple MacBook computer.

The left side wall 135a can have an interior surface 145a, an exterior surface 150a, and a plurality of cutouts or holes 140a. The holes 140a can be sized and positioned to receive the retention members and electronic connector of FIG. 1. The holes 140a can be precisely sized to exactly fit the retention members and electronic connector of FIG. 1. The holes 140a can serve as an indexing member to align the electronic connector of FIG. 1 with an electronic device seated in the tray 130.

Figure 3:
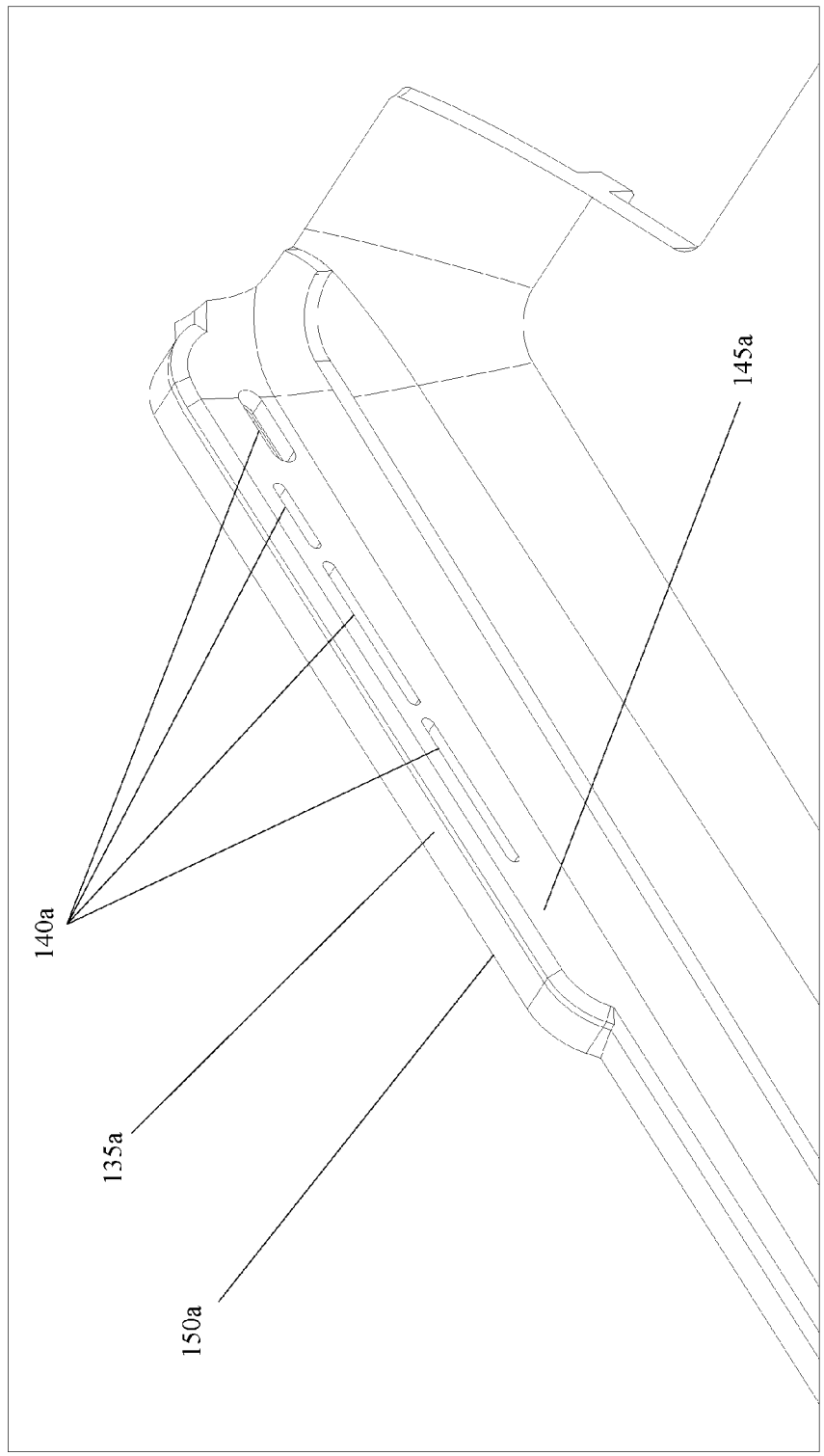
FIG. 3 is a detailed isometric view of the tray of FIG. 2 according to an exemplary embodiment of the invention.

FIG. 3 is a detailed isometric view of the tray of FIG. 2 according to an exemplary embodiment of the invention. As shown in FIG. 3, the tray has a left side wall 135a, and a plurality of cutouts or holes 140a. The left side wall 135a has an interior surface 145a and an exterior surface 150a. The cutouts 140a can be sized and shaped to precisely receive the fingers (not shown) and/or connectors (not shown) of a port block (not shown). While, the drawing of FIG. 3 particularly relates to a left side of a tray, it should be appreciated that that the features disclosed and described in conjunction with FIG. 3 are equally applicable to a right side of a tray.

Figure 4:
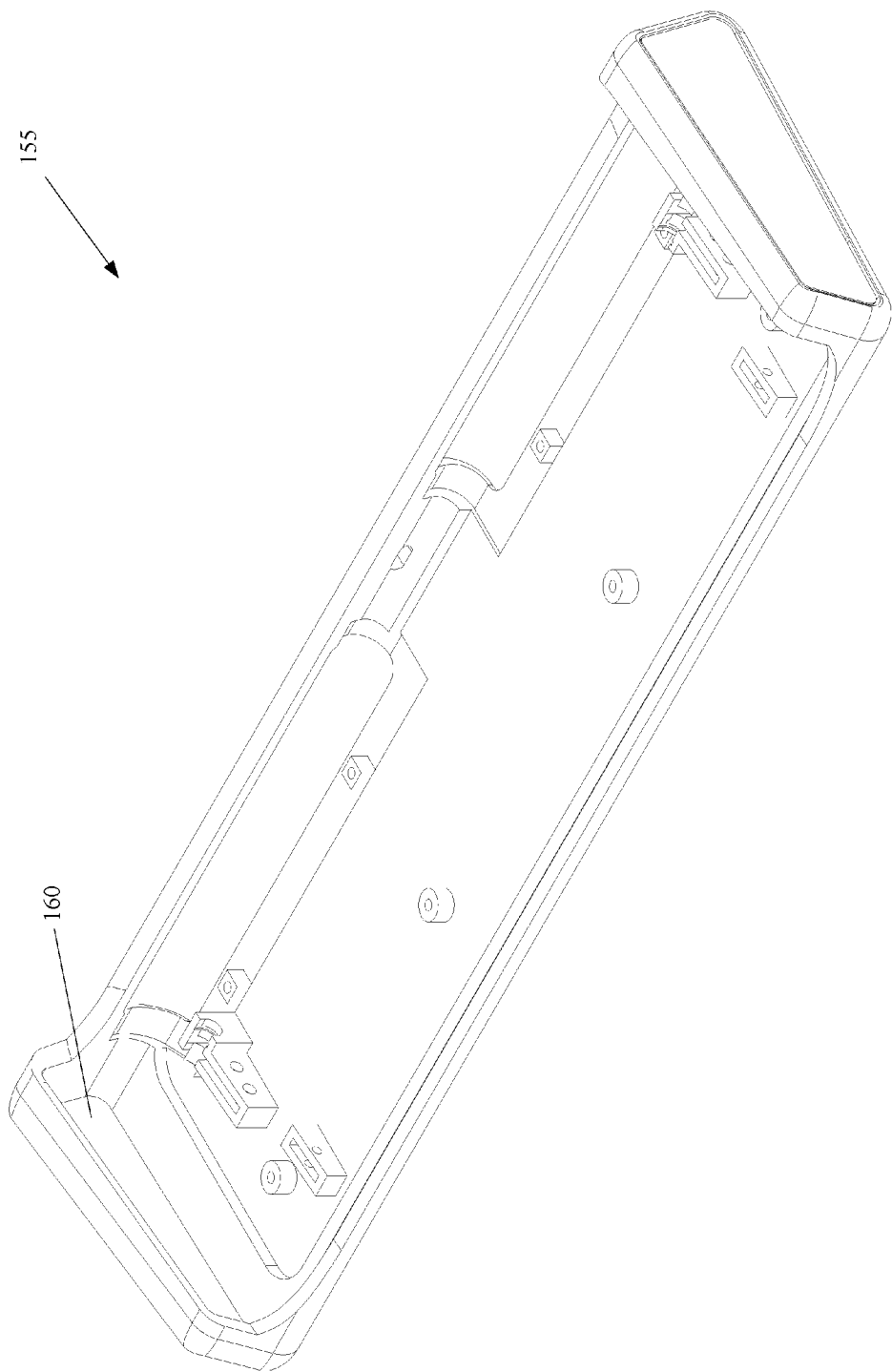
FIG. 4 is an isometric view of a chassis according to an exemplary embodiment of the invention.

FIG. 4 is an isometric view of a chassis according to an exemplary embodiment of the invention. As shown in FIG. 4, a chassis 155 includes a cavity or void 160. The chassis 155 can be made from metal or sturdy plastic. The cavity or void 160 can be sized and shaped to receive and allow the lateral translation of a port block (not shown) such as the port block shown and described in conjunction with FIG. 1. A port block (not shown) can translate or slide inside the cavity or void 160 to allow for the connectors associated with the port block to be quickly inserted or removed from an electronic device in the docking station.

Figure 5A:
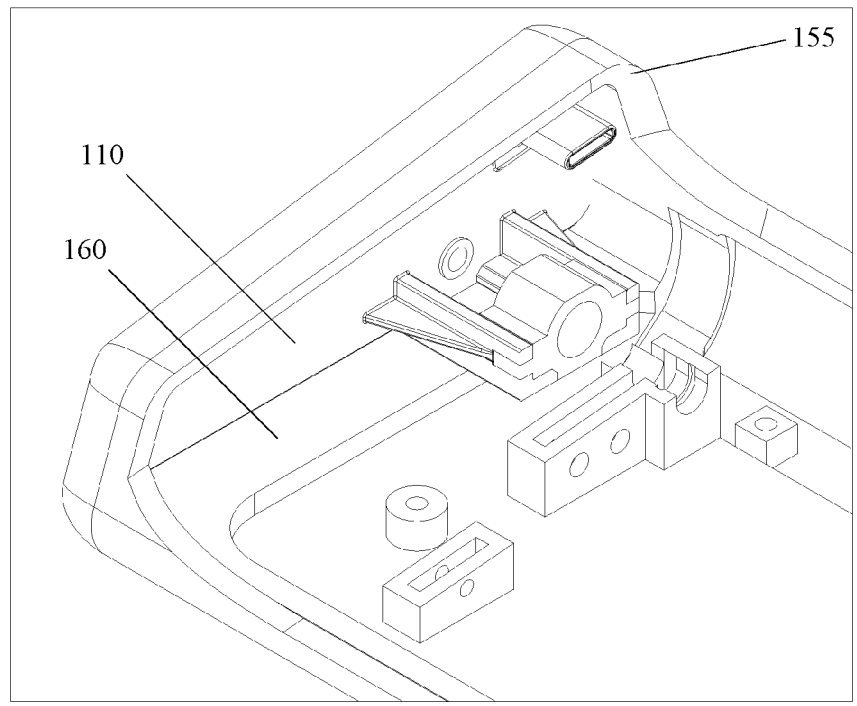
FIG. 5A is an isometric view of a chassis and port block in an open position according to an exemplary embodiment of the invention.

FIG. 5A is an isometric view of a chassis and port block in an open position according to an exemplary embodiment of the invention. As shown in FIG. 5A, a chassis 155 includes a cavity or void 160. The cavity or void 160 can receive a port block 110. The port block 110 can slide in the cavity or void 160 to an open position as shown in FIG. 5A. In the open position, the port block 110 can be disposed in a maximum recessed position with the cavity or void 160. In the alternative, in an open position, the port block can be recessed within the chassis to a sufficient extent to allow the connectors (not labeled) on the port block 110 to be removed from the corresponding ports of an electronic device (not shown) in the docking station.

Figure 5B:
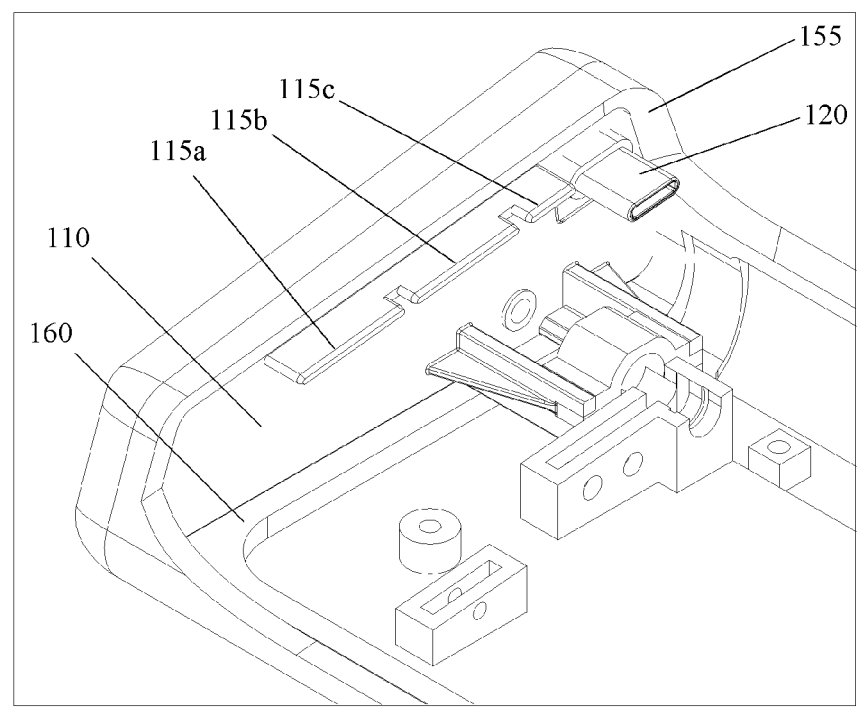
FIG. 5B is an isometric view of a chassis and port block in a closed position according to an exemplary embodiment of the invention.

FIG. 5B is an isometric view of a chassis and port block in a closed position according to an exemplary embodiment of the invention. As shown in FIG. 5B, a chassis 155 includes a cavity or void 160. The cavity or void 160 can receive a port block 110. The port block 110 can slide in the cavity or void 160 to a closed position as shown in FIG. 5B. In the closed position, the port block 110 can be minimally recessed in the in cavity or void 160 such that the fingers 115a-115c and the connector 120 protrude from the cavity or void 160, through a tray (not shown for clarity) and to an electronic device. The fingers 115a-115c can touch a top surface of the electronic device to securely retain the electronic device within the docking station. In the closed position, the fingers 115a-115c can protrude through the tray (not shown) to a minimum extent such that the fingers contact a top surface of the electronic device (such as a keyboard portion of an electronic device) yet still allow a lid of the electronic device (such as the screen of a laptop) to close without substantial interference. In the closed position, the connector 120 can protrude through the tray (not shown) and into a corresponding port of an electronic device.

Figure 5C:
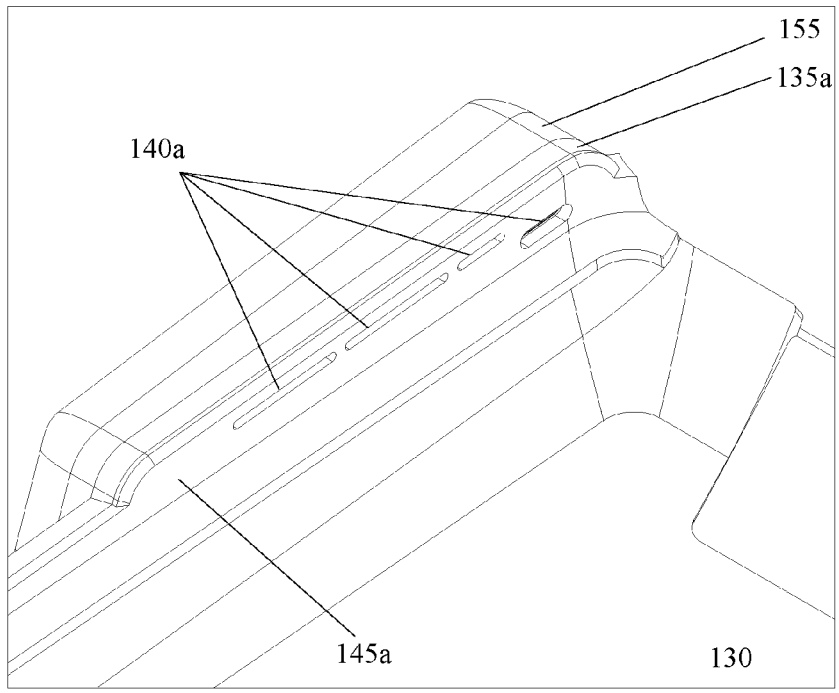
FIG. 5C is an isometric view of a chassis, tray, and port block in an open position according to an exemplary embodiment of the invention.

FIG. 5C is an isometric view of a chassis, tray, and port block in an open position according to an exemplary embodiment of the invention. As shown in FIG. 5C, a tray 130 can be attached to the chassis 155. The tray can include a left side wall 135a having a plurality of cutouts or holes 140a and an interior surface 145a. The port block (not visible) can be in an open position such that it is fully recessed into the cavity 160 of FIG. 5A and the fingers and connectors of the port block do not protrude through the holes 140a to the interior surface 145a of the left side wall 135a. In the open position an electronic device can easily be inserted or removed from the tray without interference by the fingers or the connector.

Figure 5D:
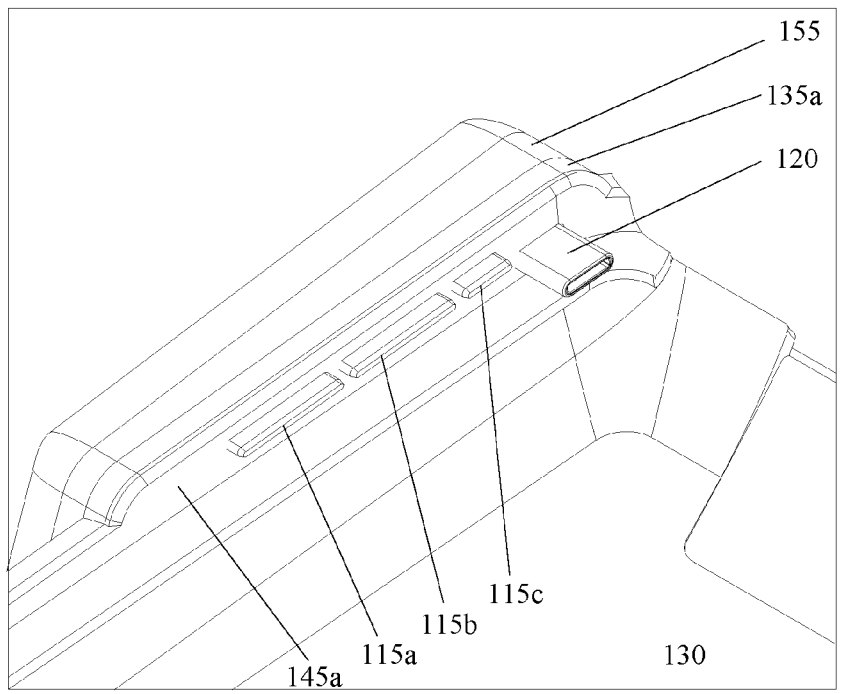
FIG. 5D is an isometric view of a chassis, tray, and port block in a closed position according to an exemplary embodiment of the invention.

FIG. 5D is an isometric view of a chassis, tray, and port block in a closed position according to an exemplary embodiment of the invention. As shown in FIG. 5D, a tray 130 can be attached to the chassis 155 and a port block 110 of FIG. 5B can be in a closed or fully inserted position. In the closed position, the fingers 115a-115c and connector 120 pass through the cutouts or holes 140a and protrude from the interior surface of the 145a of the left side wall 135a.

Figure 5E:
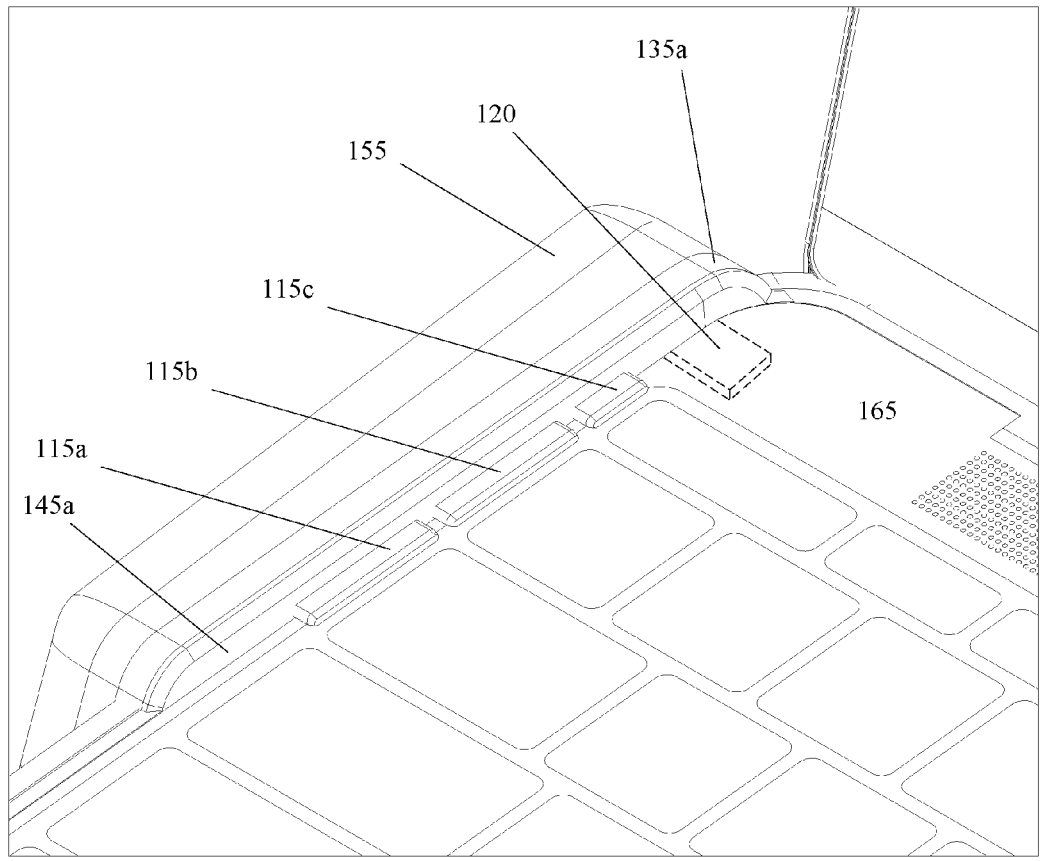
FIG. 5E is an isometric view of a chassis, tray, electronic device, and port block in a closed position according to an exemplary embodiment of the invention.

FIG. 5E is an isometric view of a chassis, tray, electronic device, and port block in a closed position according to an exemplary embodiment of the invention. As shown in FIG. 5E, a plurality of fingers 115a-115c can pass through the holes or cutouts (not labeled) in the sidewall 135a of the tray (not labeled) and protrude from an interior surface 145a of the left side wall 135a to contact a top surface of an electronic device 165 thereby retaining the electronic device in the docking station. Similarly, a connector 120 can pass through one of the holes or cutouts (not labeled) in the sidewall 135a of the tray (not labeled) and protrude from an interior surface 145a of the left side wall 135a to interface with a corresponding port (not shown) of the electronic device 165 thereby retaining the electronic device in the docking station.

Although the invention has been shown and described in conjunction with a left side wall having three fingers and one connector, other embodiments are contemplated within the scope of this invention including variations of the foregoing. These variations include, for example, one, two, three or more fingers on one side; one, two, three or more connectors on one side; different combinations of connectors and fingers on two or more sides; at least one finger and one connector on one side and at least one finger and one connector on an opposite side; a second side horizontally opposed to a first side; at least one connector and one finger on one side and at least one finger on a second side; at least one connector and one finger on one side and a dummy connector on a second side; and one or more fingers on a first side and one or more connectors on a second side and horizontally opposed to the first side.

Figure 6:
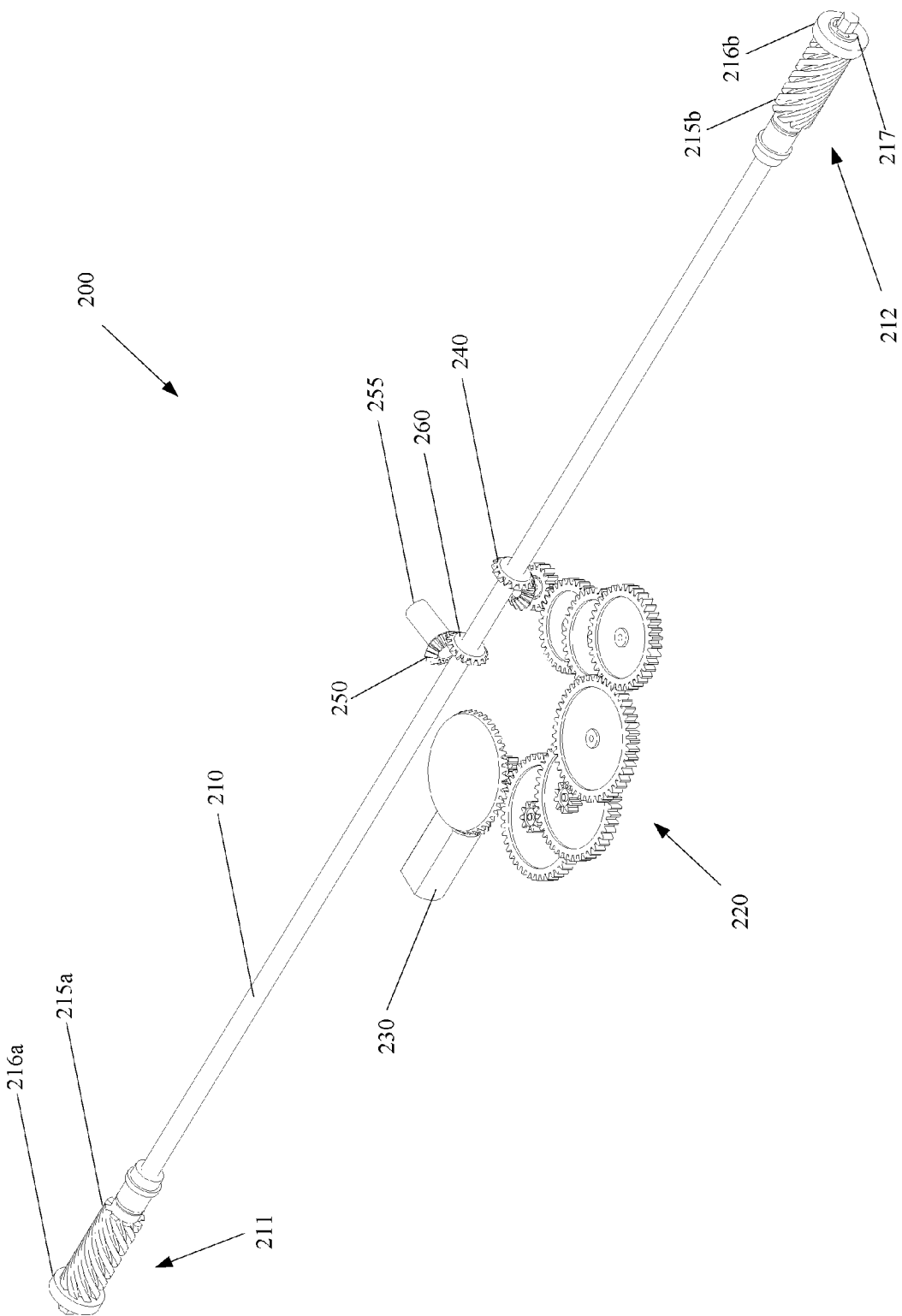
FIG. 6 is an isometric view of a drivetrain according to an exemplary embodiment of the invention.

FIG. 6 is an isometric view of a drivetrain according to an exemplary embodiment of the invention. As shown in FIG. 6, a drivetrain 200 for a docking station can include a driveshaft 210, threaded portions 215a and 215b, an electric motor 230, and gears 220. The electric motor 230 can be connected to the gears 220. One of the gears 220 can be a linking gear 240 that connects the gears 220 to the driveshaft 210. The driveshaft 210 can have two ends 211 and 212. The ends 211 and 212 of the drive shaft 210 can be hexagonal, keyed, or have other similar features for receiving threaded portions 215a and 215b and prevent the threaded portions 215a and 215b from rotating about the ends 211 and 212. The threaded portions 215a and 215b can be capped with limiting washers 216a and 216b. The threaded portions 215a and 215b and the respective limiting washers 216a and 216b can be retained on the ends 211 and 212 with retaining member such as retaining clip 217.

The gears 220 can be reducing gears that function to decrease the rotational speed and increase the power of the motor 230. Small electric motors typically operate at high speeds, such as 1,200 rpm, 1,800 rpm, or greater. Gears 220 can effectively reduce the rotational speed of the motor 230 at the driveshaft 210 and increase the power. The gears 220 can be coupled to the driveshaft 210 via a linking gear 240. The linking gear 240 can be fixed to the driveshaft 210 such that rotating the linking gear 240 causes the driveshaft 210 to rotate as well. When electrical power is applied to the motor, the motor can spin at high speed, the speed can be reduced and the power increased by way of the gears 220. The rotational energy can be transmitted to the driveshaft 210 by the linking gear 240. Rotation of the driveshaft 210 can, in turn, cause rotation of the threaded portions 215a and 215b that are fixed to the ends 211 and 212 of the driveshaft 210. The threaded portions 215a and 215b can be connected to corresponding threaded receiving portions of port blocks (not shown) of a docking station causing the port blocks to translate over the threaded portions and move from an open position to a closed position, or vice versa.

The drivetrain 200 can further include and emergency override gear 250 having a tool-receiving portion 255. The emergency override gear 250 can be coupled to the driveshaft via linking gear 260. In the alternative, the emergency override gear 250 can be coupled to the driveshaft via linking gear 240. The tool-receiving portion 255 can be, for example, a hexagonal socket for receiving an Allen wrench. In another example, the tool-receiving portion 255 can be shaped to receive a different tool, such as a Torx wrench, flathead screw driver, phillips screw driver, or other tool for imparting rotational force. In the event of a power failure or other mechanical failure, a user can turn the emergency override gear 250 by rotating the tool-receiving portion 255 with an appropriate tool. Rotating the emergency override gear 250 can cause the driveshaft 210 and its threaded portions 215a and 215b to rotate thereby translating the port blocks (not shown) from a closed position to an open position.

Figure 7:
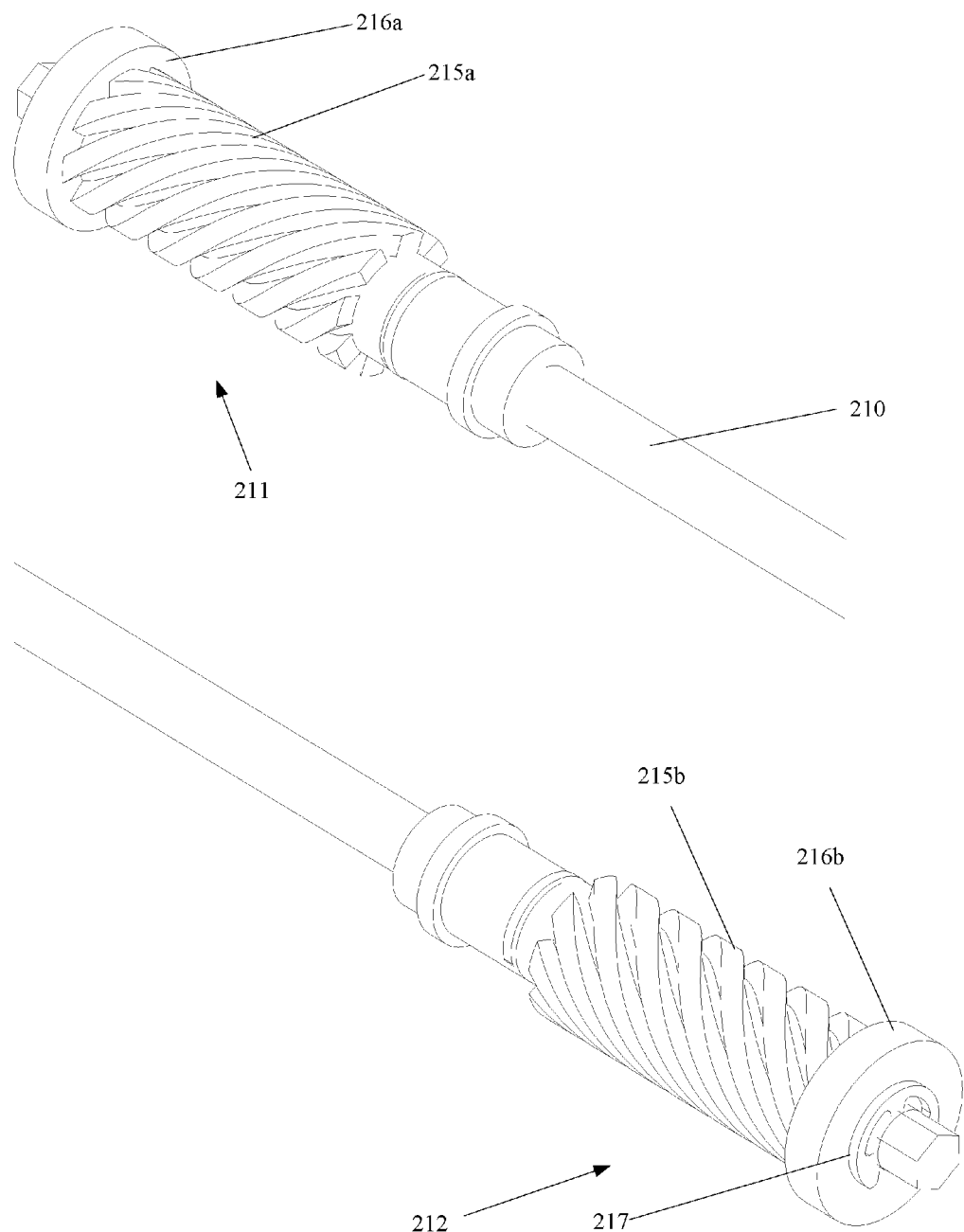
FIG. 7 is an isometric view of threaded ends of a driveshaft according to exemplary embodiments of the invention.

FIG. 7 is an isometric view of threaded ends of a driveshaft according to exemplary embodiments of the invention. As shown in FIG. 7, the driveshaft 210 includes threaded portions 215a and 215b, limiting washers 216a and 216b, and retaining clip 217. The threaded portion 215a and limiting washer 216a can be disposed at one end 211 of the driveshaft 210. The threaded portion 215b and limiting washer 216b can be disposed at an opposite end 212 of the driveshaft 210. The ends 211 and 212 of the drive shaft 210 can be hexagonal or keyed such that the threaded portions 215a and 215b are constrained to rotate together with the driveshaft 210. The retention clip 217 can hold the threaded portion 215b and limiting washer 216b on the end 212 of the driveshaft 210. Although not shown, the other end 211 can similarly include a retention clip to hold the threaded portion 215a and limiting washer 216a on the end 211 of the driveshaft 210.

The threaded portions 215a and 215b can be inserted into interface portions of port blocks (not shown) that have matching female threads. When the driveshaft and threaded portions 215a and 215b are rotated, the port blocks can move up and down the threaded portions 215a and 215b. The limiting washers 216a and 216b can prevent the threaded portions 215a and 215b from over rotating and unscrewing from the port blocks (not shown).

The threaded portion 215a can have an opposite-handed thread than that of the threaded portion 215b. The threaded portion 215a can have a left-hand thread and the threaded portion 215b can have a right-hand thread. Having an opposite thread on the threaded portions 215a and 215b can cause the port blocks to move in opposite directions. For example, rotating the driveshaft 210 and the threaded portions 215a and 215b in one direction can cause the port blocks (not shown) to move apart to an open position. Conversely, rotating the driveshaft 210 and the threaded portions 215a and 215b in the opposite direction can cause the port blocks (not shown) to move together to a closed position. It is undesirable for the threaded portions 215a and 215b to have the same handedness thread because rotation of the driveshaft 210 would cause the port blocks to move in the same direction and maintain an equal spacing between them preventing the port blocks from reaching a fully open or closed position.

Figure 8:
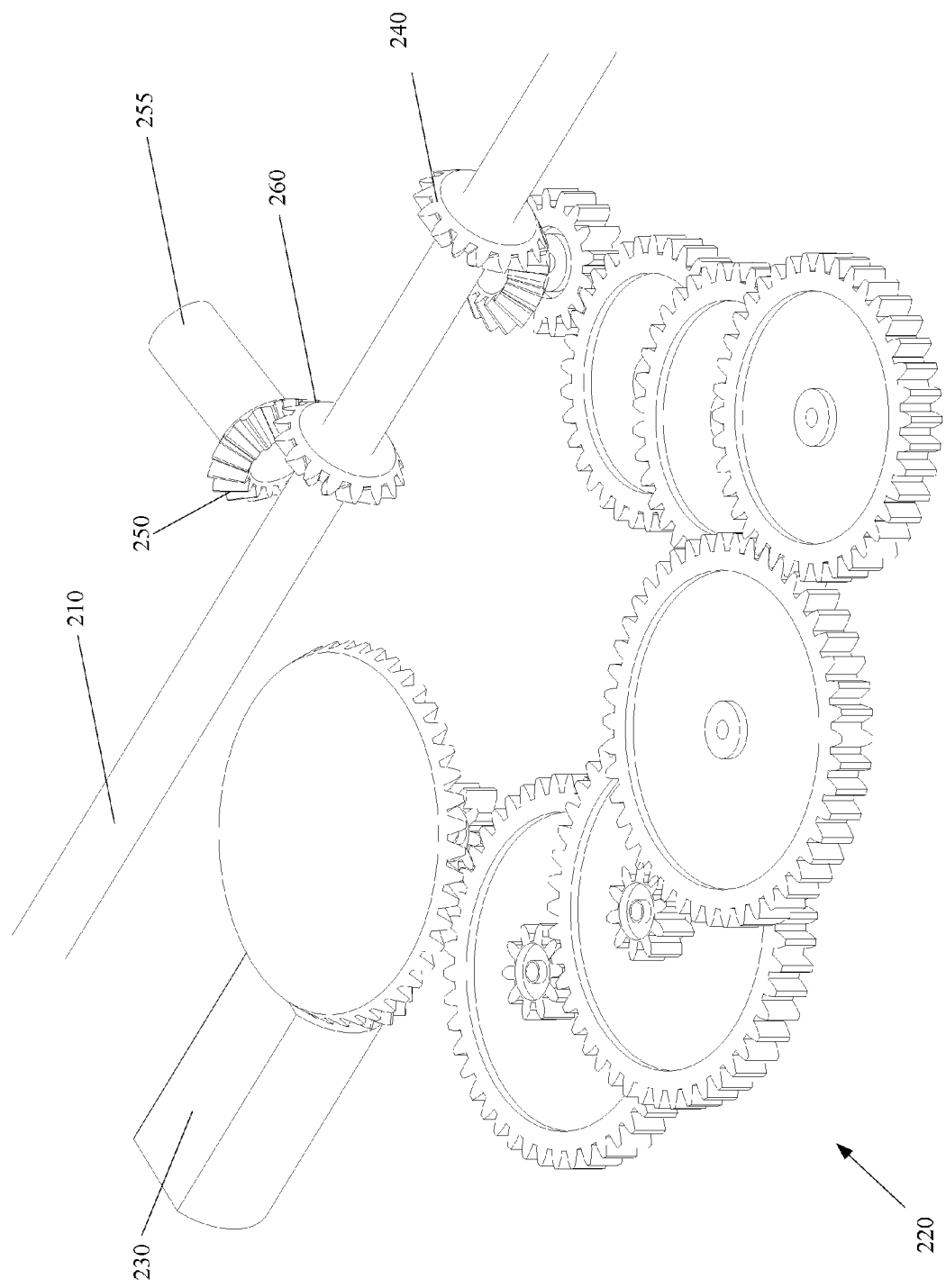
FIG. 8 is an isometric view of a gear system according to an exemplary embodiment of the invention.

FIG. 8 is an isometric view of a gear system according to an exemplary embodiment of the invention. As shown in FIG. 8, the gear system includes a motor 230, reducing gears 220 having linking gear 240, a driveshaft 210, emergency override gear 250, tool-receiving portion 255, and second linking gear 260.

The motor 230 can be connected to the gears 220 such that turning on the motor 230 will cause the gears 220 to rotate. The gears 220 can be configured in a reducing fashion such that rotational speed of the motor 230 is reduced through the gears 220 and the rotational speed at the linking gear 240 is much less. Similarly, by reducing the rotational speed, the gears can provide additional power to rotate the driveshaft 210 and can overcome the insertion force required to insert ports of a port blocks (not shown) into the corresponding ports of an electronic device. The linking gear 240 can be fixed to the driveshaft 210 so that rotating the linking gear 240 causes the driveshaft 210 to rotate.

Embodiments of the invention further include an emergency override gear 250 having a tool-receiving portion 255. In the event of electrical or mechanical malfunction, a user can manually rotate the emergency override gear 250 by turning the tool-receiving portion 255. The Emergency override gear 250 can be connected to the driveshaft 210 by linking gear 260 or, in the alternative, linking gear 240.

Figure 9:
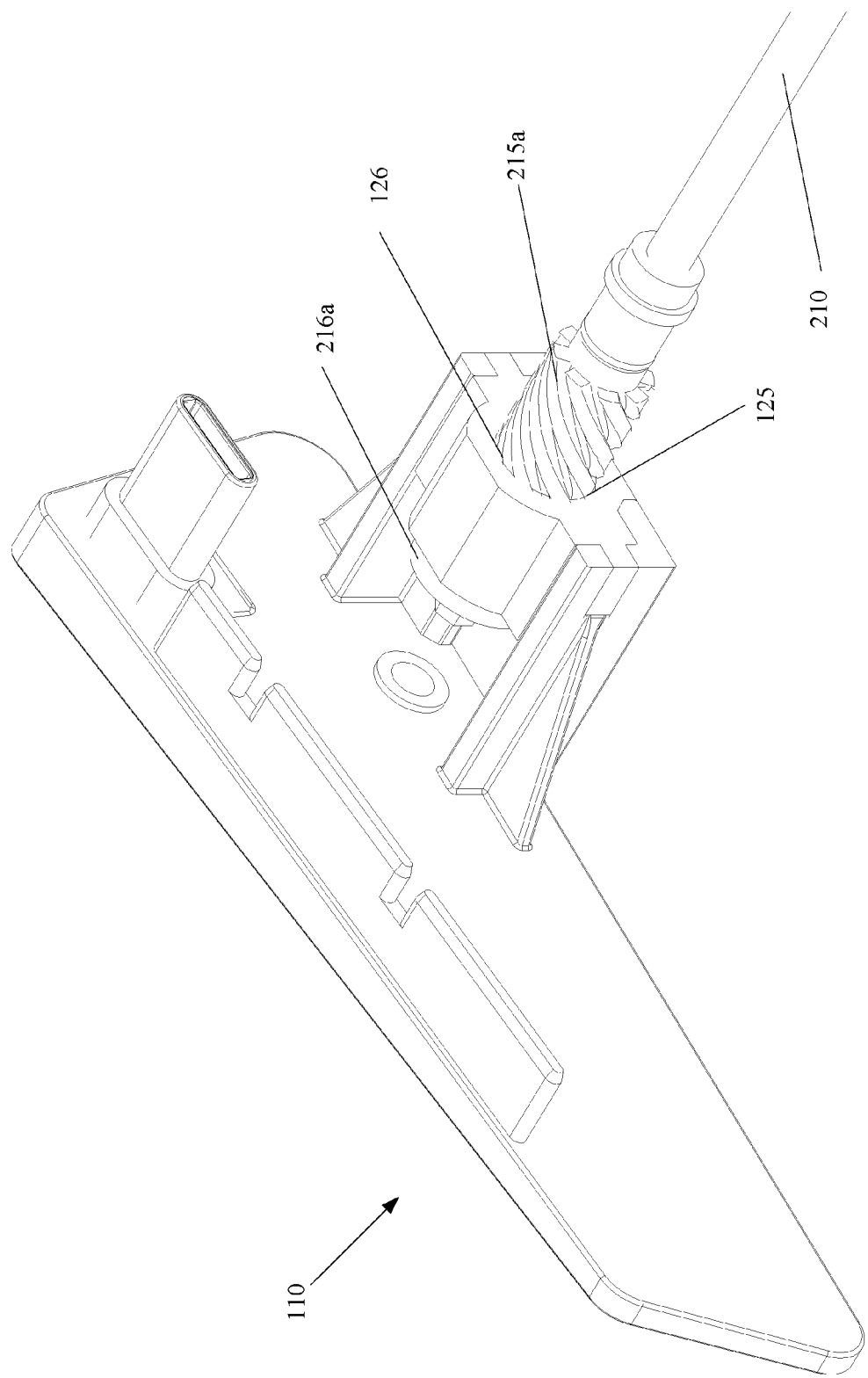
FIG. 9 is an isometric view of a port block connected to a driveshaft according to an exemplary embodiment of the invention.

FIG. 9 is an isometric view of a port block connected to a driveshaft according to an exemplary embodiment of the invention. As shown in FIG. 9, a drivetrain for a docking station can include a driveshaft 210, a threaded portion 215a disposed on an end 211 of the driveshaft, a port block 110, a drivetrain interface 125, and a receiving portion 126 of the drive train interface. The receiving portion 126 of the drive train interface can be threaded to match and receive the threaded portion 215a of the driveshaft 210. In operation, a motor and gears can rotate the drive shaft and threaded portion 215a causing the port block 110 to move or slide up and down the driveshaft 210. Limit washer 216a can be provided at an end of the driveshaft 210 to prevent over-rotation of the driveshaft 210 and prevent the threaded portion 215a from becoming disconnected from the receiving portion 126 of the drive train interface 125 of the port block 110.

Figure 10:
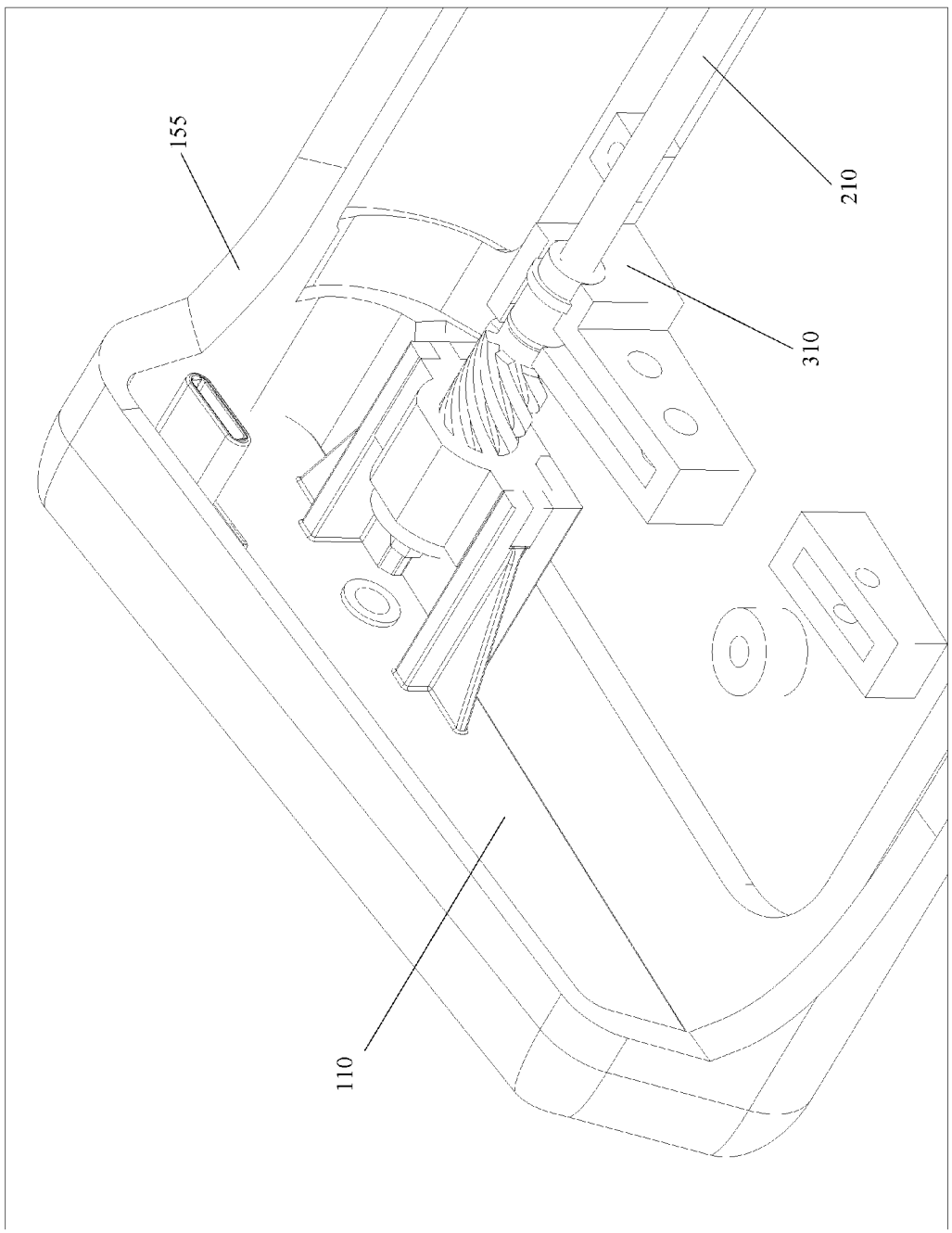
FIG. 10 is an isometric view of a port block connected to a driveshaft in a chassis according to an exemplary embodiment of the invention.

FIG. 10 is an isometric view of a port block connected to a driveshaft in a chassis according to an exemplary embodiment of the invention. As shown in FIG. 10, a drivetrain for a docking station can include a chassis 155, a port block 110, a drive shaft 210, and a pillow block 310. The driveshaft 210 can be connected to the port block 110 such that rotating the driveshaft 210 causes the port block to translate from an open to a closed position. The port block 155 and driveshaft 210 can be disposed in a chassis 155. The chassis 155 can further include a pillow block 310 for supporting and stabilizing the driveshaft 210. A mating cap (not shown) for the pillow block 310 can be provided on the underside of the tray (generally, FIG. 2) to secure the driveshaft 210 in the pillow block 310.

Figure 11A:
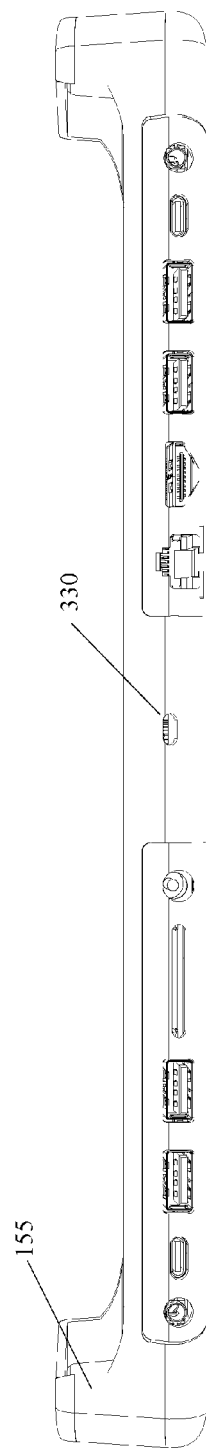
FIG. 11A is a rear view of a docking station according to an exemplary embodiment of the invention.
Figure 11B:
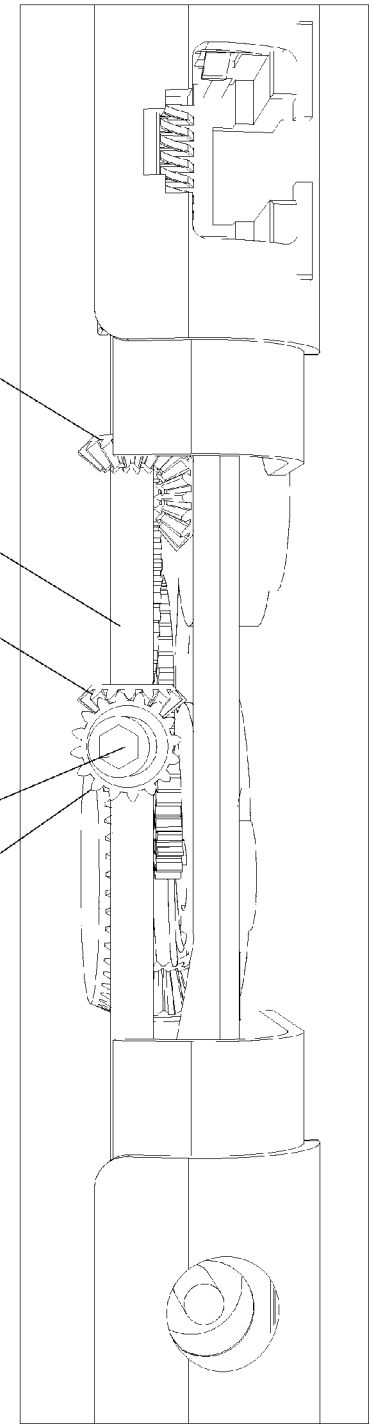
FIG. 11B is a detailed view of a rear portion of a docking station with a chassis portion removed show internal details according to an exemplary embodiment of the invention.

FIG. 11A is a rear view of a docking station according to an exemplary embodiment of the invention and FIG. 11B is a detailed view of a rear portion of a docking station with a chassis portion removed show internal details according to an exemplary embodiment of the invention. As shown in FIG. 11A and FIG. 11B, a docking station can include a chassis 155, plurality of ports 320, a Kensington-style security hole 330, an emergency override gear 250, a tool-receiving portion 255, a linking gear 260, a linking gear 240, and a drive shaft 210.

The Kensington-style security hole 330 can be rectangular shaped extending approximately 7.5 millimeters in width and 3.65 millimeters in height. The security hole 330 can be disposed on a rear portion of the chassis 155. The chassis and/or the security hole 330 can be formed from metal for added security. The security hole 330 can be disposed such that it covers a tool-receiving portion 255 of the emergency override gear 250. When a locking device is inserted and locked in the security hole 330, access to the tool-receiving portion 255 of the emergency override gear 250 is blocked thereby securing the docking station and any docked computer from theft. Blocking access to the tool-receiving portion 255 of the emergency override gear 250 also prevents nefarious parties from manually actuating the port blocks from a closed position to an open position and removing a docked electronic device. When the security hole 330 does not have a lock in it, the tool-receiving portion 255 of the emergency override gear 250 can be easily accessed with an appropriate tool such as an Allen wrench.

Turning the tool-receiving portion 255 of the emergency override gear 250 causes the linking gear 260 to rotate the driveshaft 210 thereby causing the port blocks (not shown) to translate from a closed to an open position. In an alternative embodiment, the emergency override gear 250 is connected to the linking gear 240 in which case the linking gear 260 can be omitted.

It will be apparent to those skilled in the art that various modifications and variations can be made in the drivetrain for a motorized docking station without departing from the spirit or scope of the invention. Thus, it is intended that embodiments of the invention cover the modifications and variations of this invention provided they come within the scope of the appended claims and their equivalents.

What is claimed is:

1. A docking station for an electronic device, the docking station comprising:
   a port block;
   a drivetrain interface of the port block;
   a threaded receiving portion of the drivetrain interface;
   a driveshaft;
   a threaded end of the driveshaft coupled to the threaded receiving portion; and
   a limit washer on the threaded end of the driveshaft.

2. The docking station of claim 1 further comprising:
   a plurality of gears;
   a electric motor coupled to the plurality of gears; and
   a linking gear of the plurality of gears, the linking gear fixed to the drive shaft.

3. The docking station of claim 1 further comprising:
   a Kensington-style security slot;
   a manual override gear;
   a tool-receiving portion of the manual override gear; and
   wherein the tool-receiving portion of the manual override gear is disposed behind the Kensington-style security slot.

4. The docking station of claim 3 wherein the manual override gear is coupled to the linking gear.

5. The docking station of claim 3 further comprising:
   a second linking gear coupled to the driveshaft and the manual override gear.

6. The docking station of claim 1 wherein the port block is configured to translate between a substantially open position and a substantially closed position along the threaded end of the driveshaft.

7. The docking station of claim 1 further comprising:
   a chassis;
   a pillow block of the chassis; and
   wherein the driveshaft passes through the pillow block.

8. A drivetrain for use in a motorized docking station, the drivetrain comprising:
   a driveshaft;
   a first threaded end of the driveshaft having a left-hand thread;
   a second threaded end of the driveshaft having a right-hand thread;
   a limit washer on one of the first threaded end or the second threaded end;
   a plurality of gears;
   a electric motor coupled to the plurality of gears; and
   a linking gear of the plurality of gears, the linking gear fixed to the drive shaft.

9. The drivetrain of claim 8 further comprising:
   a retention member securing the limit washer.

10. The drivetrain of claim 8 further comprising:
    a port block coupled to the first threaded end of the driveshaft.

11. The drivetrain of claim 10 wherein the port block is configured to translate between a substantially open position and a substantially closed position along the first threaded end of the driveshaft.

12. The drivetrain of claim 8 further comprising:
    a manual override gear; and
    a tool-receiving portion of the manual override gear.

13. The docking station of claim 12 wherein the manual override gear is coupled to the linking gear.

14. The docking station of claim 12 further comprising
    a second linking gear coupled to the driveshaft and the manual override gear.

15. The docking station of claim 12 wherein the tool-receiving portion of the manual override gear is disposed behind a Kensington-style security slot.

16. A docking station for an electronic device, the docking station comprising:
    a port block;
    a drivetrain interface of the port block;
    a threaded receiving portion of the drivetrain interface;
    a driveshaft;
    a first threaded end of the driveshaft having a first thread direction and coupled to the threaded receiving portion;
    a limit washer on the first threaded end of the driveshaft,
    a plurality of gears;
    a electric motor coupled to the plurality of gears;
    a linking gear of the plurality of gears, the linking gear fixed to the drive shaft; and
    wherein the port block is configured to translate between a substantially open position and a substantially closed position along the first threaded end of the driveshaft.

17. The docking station of claim 16 further comprising:
    a second port block;
    a second drivetrain interface of the second port block;
    a second threaded receiving portion of the second drivetrain interface;
    a second threaded end of the driveshaft having a second thread direction, wherein the second thread direction is an opposite thread direction of the first thread direction; and
    wherein the second threaded end of the driveshaft is coupled to the second threaded receiving portion.

18. The docking station of claim 16 further comprising:
    a Kensington-style security slot;
    a manual override gear;
    a tool-receiving portion of the manual override gear; and
    wherein the tool-receiving portion of the manual override gear is disposed behind the Kensington-style security slot.

* * * * *